Feb. 15, 1949.  F. C. NEUHART  2,461,838
SOLID BED CATALYST REGENERATION PROCESS
Filed June 21, 1943
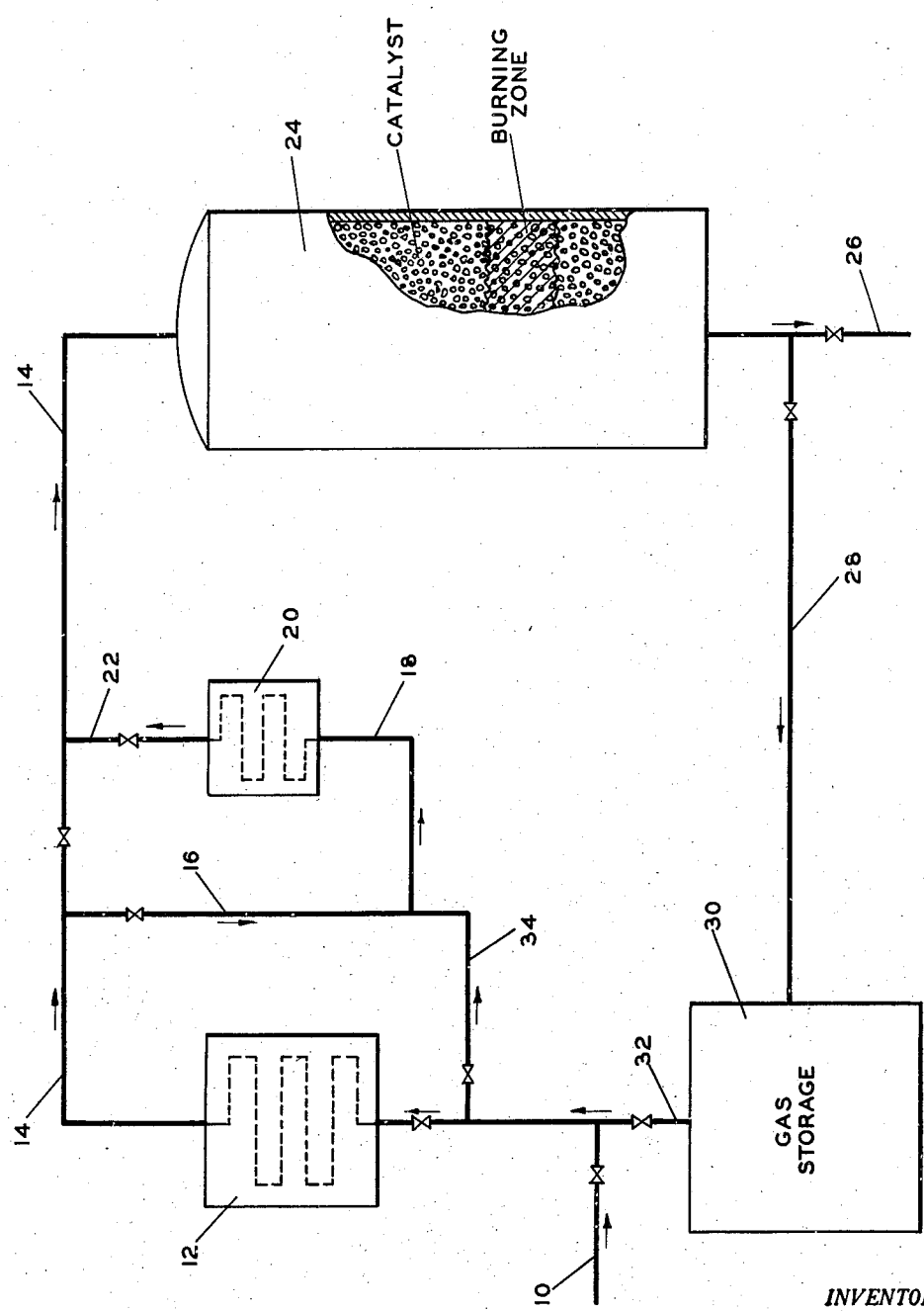
INVENTOR.
FREDERICK C. NEUHART
BY Hudson and Young
ATTORNEYS Patented Feb. 15, 1949

2,461,838

UNITED STATES PATENT OFFICE 2,461,838

SOLID BED CATALYST REGENERATION PROCESS

Frederick C. Neuhart, Bartlesville, Okla., assignor to Phillips Petroleum Company, a corporation of Delaware Application June 21, 1943, Serial No. 491,709

2 Claims. (Cl. 252—242)

This invention relates to an improved method of regenerating or reactivating contaminated solid catalyst material and is especially concerned with the regeneration of solid catalyst material that has been rendered more or less inactive due to being contaminated with carbonaceous material in the course of being used to promote a hydrocarbon conversion procedure. As will be observed further along, a specific application of this invention resides in its use in regenerating deactivated solid catalyst material that is used to promote the dehydrogenation of hydrocarbons.

It is the primary object of this invention to effectively regenerate substantially spent solid catalyst material and place the same in a condition for use in promoting a subsequent conversion reaction.

My invention has for another object the reconditioning of a solid catalyst mass, that has been contaminated in a catalyst conversion operation, more completely and in a shorter interval of time than has been generally possible heretofore.

Another object of the instant invention is the regeneration of solid catalyst material by treating the same in a manner whereby the complete cycle of carrying out a catalytic hydrocarbon conversion and subsequently regenerating deactivated catalyst to place the same in condition for reuse is materially expedited and improved.

Other objects will be apparent to one skilled in the art from the present disclosure and the accompanying drawing which represents one embodiment of the present invention.

Present day processes for converting hydrocarbons in the presence of a solid type catalyst require a cyclic type operation. The catalyst is employed for a necessary period of time and under proper conditions to promote the desired hydrocarbon conversion. At the end of this time the catalyst activity, has, as a rule, decreased to such an extent, due to the deposition of carbon thereon, and perhaps to other changes in the catalyst, that it becomes desirable and necessary to regenerate the same by burning off the deposited carbon. After the catalyst has been regenerated to an extent suitable for reuse, it is again employed to promote the conversion of hydrocarbons. In normal plant operations about one-half of the usual catalyst tubes or cases of a unit are operated on the conversion portion of the cycle, while the other half are on the catalyst regeneration portion of the cycle to thereby permit uniform operation of equipment downstream of the catalyst cases.

The most convenient method of regenerating a solid type hydrocarbon conversion catalyst, in place, contemplates passing a regenerating fluid comprising an inert fluid and controlled amounts of free oxygen-containing gas over and through the catalyst mass. The free oxygen so supplied to the catalyst material effects combustion of deposited carbon, forming carbon dioxide, which is readily removed with the inert fluid. The inert fluid serves to absorb part of the heat of combustion, thereby preventing excessive temperatures which might impair the efficiency of the catalyst itself or damage the surrounding tube or case material. The inert fluid ordinarily employed comprises such inert gases as nitrogen and carbon dioxide; whereas the free oxygen-containing gas may be supplied from the air.

The conventional method of regenerating solid catalyst that has been deactivated, due to the deposition of carbonaceous material, is to supply to the deactivated catalyst, at a temperature of 700° F., or higher, an inert gas with a controlled amount of free oxygen. The carbon deposits may be burned off at or above 700° F. Such a chemical reaction is exothermic in nature, and a "hot spot," or burning zone, is created at the point of regeneration. This hot spot, or burning zone, is occasioned by the rise in temperature above the average temperature of the rest of the material. As the carbon is burned off in a particular area, the burning zone travels through the catalyst case progressively, burning off the carbon until it reaches the end of the case. After the burning zone has passed through the catalyst material, further combustion of carbonaceous material is retarded or slowed down, as is indicated by the presence of uncombined free oxygen in effluent regenerating fluid. The usual procedure after the larger part of the carbon has been burned from the catalyst, which generally occurs when the burning zone reaches the end of the catalyst case, is to continue supplying regenerating fluid with controlled free oxygen-containing gas at the same temperature level at which the combustion reaction was initiated until there is no further consumption of oxygen. In this manner, remaining carbonaceous material is removed from the catalyst. The procedure outlined above is time-consuming. Furthermore since the average temperature level of regeneration is generally below that required during the conversion portion of the cycle in certain processes, such as in the dehydrogenation of normal butane, by reason of the fact that it is essential to avoid excessively high local temperatures as the burning zone passes through the catalyst and thereby prevent injury to the catalyst itself or to material of the catalyst tubes and/or case, an additional interval of time is required to heat the catalyst material to the hydrocarbon conversion temperature. Moreover, I have found that this procedure does not completely reactivate catalysts of certain types, as evidenced by a more rapid failure in catalyst activity in subsequent cycles. There are factors in addition to residual carbon on the catalyst which may be responsible for incomplete regeneration and more rapid failure in catalyst activity in subsequent conversion cycles. Water may be adsorbed on the catalyst surface during the regeneration period rendering the catalyst temporarily inactive due to catalyst poisoning. Another possible factor involved in substantially completing catalyst regeneration may be a change in catalyst valence. This change in valence through oxidation is only temporary; upon passage of the hydrocarbon stream for conversion the catalyst is immediately reduced. However, the temporary oxidation of the catalyst appears to increase the activity of the catalyst and improve the yield in the subsequent conversion portion of the cycle. Thus the incomplete regeneration effected by conventional methods on certain type catalysts while apparently occasioned by residual carbonaceous material remaining on the catalyst after the regeneration portion of the cycle has been completed, may be due in greater degree to other factors such as the failure to effectually remove residual moisture from the surface of the catalyst or failure to effect a change in the valence of the catalyst. These combined factors result in failure to return certain type catalysts to substantially initial activity when ordinary methods of regeneration are employed.

The practice of my invention affords more complete regeneration of the catalyst material and materially shortens the time required to carry out a complete conversion and regeneration cycle. I have discovered that by changing the conventional procedure in regenerating contaminated solid catalyst material, more complete removal of contaminating material in a shorter period of time may be readily attained. Additionally, the catalyst is thereby placed in a condition for reuse to promote the desired conversion. In its basic aspects the present invention includes the treating of catalyst material that has become degenerated by virtue of the deposition of carbonaceous material thereon, with an inert gas, containing a controlled amount of oxygen, to burn off the major part of the carbonaceous material at a low temperature during a period known as active regeneration, and thereby to partially regenerate the catalyst. The catalyst is not restored to its original activity by this active regeneration, therefore, the catalyst is further treated during a conditioning period with the same regeneration gas or other suitable gas such as combustion gas from the active regeneration at sufficiently high temperatures to burn off any remaining carbonaceous material, to effectually eliminate catalyst poisoning by removal of the moisture from the surface of the catalyst, perhaps to effect a change in the valence of the catalyst, and incidentally to heat the catalyst material to a temperature suitable for carrying out the conversion process when the catalyst is again placed on stream. By reason of conditioning the catalyst with the same regenerating gas at sufficiently high temperatures, combustion of any residual carbon is accelerated, temporary poisoning is reduced, and perhaps other beneficial changes such as valence are effected. Thus the catalyst is returned to substantially original state of activity in a shorter period of time. In addition the high conditioning temperatures serve to heat the catalyst to approximately that temperature necessary for the catalytic conversion operations.

For a better understanding of the invention, reference is made to a specific embodiment represented by the accompanying figure in which the numeral 10 represents an inlet by which regenerating gas may be introduced into heater 12, which may be a coil furnace. The effluent from the heater is passed by line 14 into the catalyst chamber 24 in which the initial stage, or active, regeneration is effected by combustion in an advancing burning zone as described. When active regeneration is completed by the burning zone having completely traversed the length of the catalyst mass, all or a portion of the regeneration gas from the heater 12 may be directed by lines 16 and 18 into an auxiliary heater 20 in which the gases passing therethrough are heated to the temperature desired in the secondary regeneration and conditioning period or superheated above this desired temperature and remixed with the remaining regeneration gas in line 14 through line 22 to establish desired temperature if only part of the effluent from heater 12 is diverted through the auxiliary heater. The gas for the secondary stage or conditioning period may, if desired, be composed of substantially inert effluent flue gas from the regeneration zone, the gas being heated to the desired temperature for this conditioning period, as described below. Effluent gases from the catalyst chamber during regeneration may be removed from the system by line 26 or directed in whole or in part through line 28 to a gas storage 30 from which the gases may be withdrawn via line 32 into heater 12 and thence through the system as explained or any proportion of the gas may be directed by lines 34 and 18 through auxiliary heater 20 and into the regeneration system, as desired. Regeneration gases from line 10 and combustion gas from storage 30 may be admixed in any proportion and directed through the regeneration system as desired or required to effect regeneration and conditioning of the catalyst. Various equipment for the successful operation of the process will be obvious to one skilled in the art. By various pumps (not shown) and valves the paths of flow, proportions of mixtures of gases, and sensitive control of the regeneration may be realized. Although only one catalyst chamber is indicated as being regenerated, it is understood that several may be regenerated simultaneously.

In the practice of my invention a regenerating fluid such as nitrogen, carbon dioxide, or any other preferred inert gas, together with a controlled content of free oxygen-containing gas, is brought in intimate contact with a mass of deactivated catalyst at a temperature of 700° F., or higher, to initiate combustion and create a burning zone of the type indicated above to thereby burn the major part of the deposited carbonaceous material. This treatment constitutes the active regeneration period. After the burning zone has progressed through the entire mass of catalyst, further treating known as conditioning is carried out in order to return the catalyst to substantially original activity. Conditioning comprises heating the catalyst case to 1100° F., or higher, while continuing to pass the same or a different regeneration gas, such as combustion gases from the active regeneration period, through the catalyst case. Depending upon the optimum temperature level of the conversion operation part of the cycle, the temperature, upon completion of the regeneration part of the cycle, may be somewhat below, equal to, or somewhat above the temperature employed in the hydrocarbon conversion part of the complete cycle. By increasing the temperature of the catalyst material when the major part of the deposited carbon has been burned off, more complete regeneration within a shorter period of time is obtained. In addition to effecting a more complete regeneration and shortening the period of regeneration, the temperature increase effected during the burning off of the residual deposited carbon raises the catalyst to reaction temperature without the need of an additional period for heating the same. Decreased time required for carrying out a complete cycle, including both conversion and regeneration, and a more efficient catalyst regeneration are thus attained.

By way of illustration, results obtained in the practice of my invention are outlined below. The data are the average results of a large number of dehydrogenation and regeneration cycles compiled for use by the operators of this process. Thus for a desired per cent conversion on the next run, the operator can determine the optimum temperature for conditioning the partially regenerated catalyst and also the length of time required. The data tabulated pertain to complete n-butane dehydrogenation and regeneration cycles conducted over a solid chrome-alumina type catalyst. The average temperature used during the dehydrogenation portion of the cycle was 1095° F. in all instances. The active regeneration temperature was approximately 800° F.

*Table I.—Showing effect of conditioning time and temperature on conversion*

| Average Conditioning Temperature, °F. | Conditioning Time in minutes | | | | | |
|---|---|---|---|---|---|---|
| | 40 | 30 | 20 | 15 | 10 | 5 |
| | Per Cent Conversion | | | | | |
| 1145 | | | | 39.8 | 38.1 | 35.7 |
| 1135 | | | 40.1 | 39.1 | 37.3 | 35.8 |
| 1130 | 39.6 | 39.3 | 38.7 | 37.6 | 35.8 | 33.3 |
| 1125 | 37.2 | 36.8 | 35.9 | 34.8 | 33.3 | 31.3 |
| 1120 | 33.5 | 33.3 | 32.1 | 31.3 | 30.2 | |

In order to show the effect of time and temperature on the catalyst activity during the conditioning period, operating conditions during the dehydrogenation cycle were, in each instance, held constant. During the dehydrogenation portion of the cycles, the temperature was maintained at 1095° F. with a feed flow rate of approximately two cubic feet of n-butane per minute, per .2127 cubic foot of catalyst (i. e., with an approximate space velocity of 565), the average catalyst bed pressure at 20 p. s. i. a. and the time at 30 minutes. With the above dehydrogenation operating conditions held constant during each cycle, the temperature and length of the conditioning period were varied. The pressure, flow rate and oxygen content of the regeneration gas were held constant at 52 p. s. i. a., 9.35 cubic feet per minute per .2127 cubic foot of catalyst, and two per cent, respectively. After each regeneration cycle, the average activity of the catalyst (expressed in per cent of n-butane converted) was determined during the following dehydrogenation cycle.

From the tabulation, it can be seen that at conditioning temperature of 1130° F., the activity of the catalyst (expressed in per cent conversion) for the next dehydrogenation run increases rather rapidly with an increase in the conditioning time. After 5 minutes, the per cent conversion for the next run was 33.3 per cent; after 10 minutes, 35.8 per cent; after 15 minutes, 37.6 per cent, etc. While at 1125° F. conditioning temperature the per cent conversion was 31.3 after 5 minutes; 33.3 per cent after 10 minutes; and 34.8 after 15 minutes. Thus the data indicate that, increased time spent conditioning the catalyst results in increased catalyst activity as indicated by increased per cent conversion, and the higher conditioning temperatures will effect greater per cent conversion when the catalyst is conditioned over the same period of time.

From the foregoing, it is believed that the many advantages obtainable by the practice of the present invention will be readily apparent to persons skilled in the art. However, since certain changes may be made in carrying out the above method without departing from the scope of the invention as defined by the appended claims, it is intended that all matter contained herein shall be interpreted as illustrative and explanatory, rather than in a limiting sense.

I claim:

1. An improved process for the regeneration of a mass of solid catalytic material deactivated by deposition thereon of carbonaceous material during a hydrocarbon conversion, which comprises removing a major portion of said carbonaceous material by combustion in an active regeneration step at a temperature of 800° F. in the presence of an inert gas containing about 2 per cent oxygen during which a relatively narrow burning zone of active combustion progressively moves from one end of said catalyst mass to the other, immediately thereafter raising the temperature of said catalyst mass from said 800° F. to about 1100° F. and continuing the passage of said oxygen-containing gas through said catalyst mass in a conditioning step for a period between 5 and 40 minutes at a temperature between 1100 to 1145° F. and about 5 atmospheres pressure to complete said regeneration of said catalyst.

2. An improved process for the regeneration of a mass of solid catalytic material deactivated by deposition thereon of carbonaceous material during a hydrocarbon conversion, which comprises removing a major portion of said carbonaceous material by combustion in a relatively narrow burning zone which progresses through entire length of said catalyst mass in an active regeneration step substantially at the temperature at which combustion may be initiated and at about 700° F. in the presence of a regenerating gas containing a relatively small amount of oxygen, after said combustion zone has progressed throughout the entire mass of catalyst raising the temperature of said mass to a temperature of at least 1100° F. and continuing the passage of said oxygen-containing regenerating gas in a catalyst conditioning step at the higher temperature for a period of time sufficient to complete said regeneration of said catalyst.

FRED C. NEUHART.

REFERENCES CITED

The following references are of record in the file of this patent:

UNITED STATES PATENTS

| Number | Name | Date |
|---|---|---|
| 2,162,893 | Kuhl | June 20, 1939 |
| 2,184,235 | Groll et al. | Dec. 19, 1939 |
| 2,199,837 | Murphree | May 7, 1940 |
| 2,211,211 | Kassel | Aug. 13, 1940 |
| 2,225,402 | Liedholm | Dec. 17, 1940 |
| 2,249,337 | Visser et al. | July 15, 1941 |
| 2,265,964 | Carpenter | Dec. 9, 1941 |
| 2,290,845 | Voorhees | July 21, 1942 |
| 2,311,979 | Corson | Feb. 23, 1943 |
| 2,320,273 | Gohr et al. | May 25, 1943 |
| 2,325,287 | Thomas | July 27, 1943 |
| 2,350,730 | Degnen et al. | June 6, 1914 |
| 2,353,508 | Schulze | July 11, 1944 |
| 2,357,332 | Kelly et al. | Sept. 5, 1944 |
| 2,368,507 | Welty | Jan. 30, 1945 |
| 2,369,523 | Belchetz | Feb. 13, 1945 |
| 2,382,472 | Frey | Aug. 14, 1945 |
| 2,388,536 | Gunness | Nov. 6, 1945 |